Figure 1:
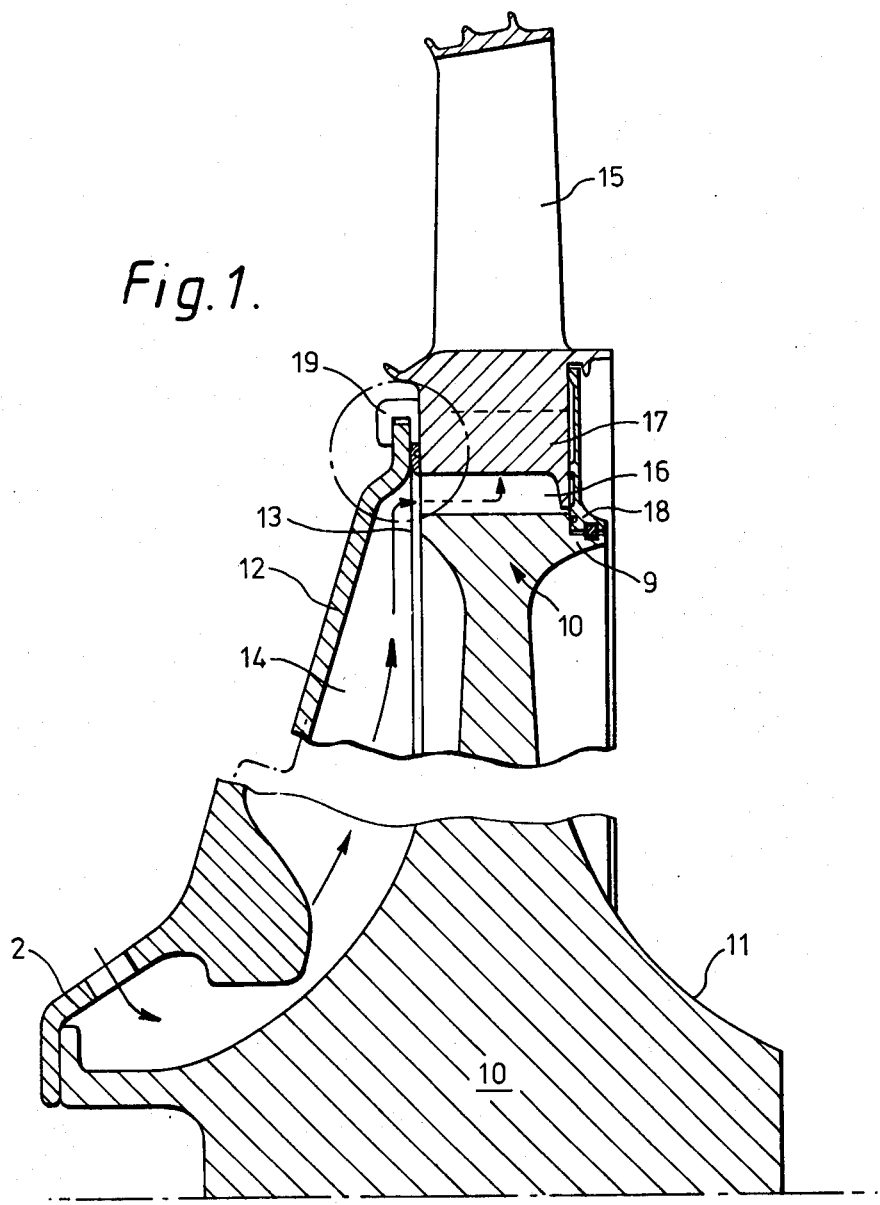

United States Patent [19]

Langley

[11] 4,432,555
[45] Feb. 21, 1984

[54] CENTRIFUGAL SEAL WITH DEFORMABLE FRUSTOCONICAL SEALING RING

[75] Inventor: Kenneth R. Langley, Gloucestershire, England

[73] Assignee: Rolls Royce Limited, England

[21] Appl. No.: 341,609

[22] Filed: Jan. 22, 1982

Related U.S. Application Data

[63] Continuation of Ser. No. 119,935, Feb. 8, 1980, abandoned.

[30] Foreign Application Priority Data

Feb. 21, 1979 [GB] United Kingdom ............... 790617

[51] Int. Cl.³ .................... F16J 15/34; F16J 15/54
[52] U.S. Cl. ................................. 277/25; 277/83; 277/177; 416/174; 418/136
[58] Field of Search ............ 277/25, 67, 81 R, 83, 277/91, 95, 133, 167.5, 173–177, 187, 236; 416/174; 418/104, 136, 139; 308/36.1

[56] References Cited

U.S. PATENT DOCUMENTS

| | | |
|---|---|---|
| 2,382,245 | 8/1945 | McCormack ............... 308/36.1 X |
| 2,866,655 | 12/1958 | Stanbro . |
| 2,890,069 | 6/1959 | Larkin et al. ............... 277/133 X |
| 2,948,431 | 8/1960 | Kuhn ............................. 220/298 |
| 3,506,276 | 4/1970 | Petersen et al. ............. 277/91 |
| 3,518,020 | 6/1970 | Lake ........................... 277/175 X |

FOREIGN PATENT DOCUMENTS

| | | | |
|---|---|---|---|
| 1245237 | 7/1967 | Fed. Rep. of Germany | 277/25 |
| 369329 | 6/1963 | Switzerland | 277/25 |

*Primary Examiner*—Robert S. Ward
*Attorney, Agent, or Firm*—Parkhurst & Oliff

[57] ABSTRACT

An arrangement for effecting a seal between components 10,12 that rotate together and between which relative radial movement is tolerated while maintaining the seal. A conical, or Belleville, sealing ring 25 is located between the components 10,12 and means 19,22 are provided for clamping the components 10,12 together. The sealing ring 25 is so shaped and dimensioned that, in use, centrifugal forces acting on the ring 25 impart a turning moment to the ring 25 to cause it to twist and effect a seal with each of the components 10,12.

8 Claims, 4 Drawing Figures

CENTRIFUGAL SEAL WITH DEFORMABLE FRUSTOCONICAL SEALING RING

This is a continuation of application Ser. No. 119,935 filed Feb. 8, 1980, now abandoned.

This invention relates to an arrangement for effecting a seal between components that rotate together and between which relative radial movement is tolerated. In particular, the invention relates to an arrangement for effecting a seal between a turbine or compressor disc of a gas turbine engine and a cover plate or other structure which rotates with the disc.

In some designs of gas turbine engine the turbine blades are cooled by flowing high pressure cooling air through air passages passing through the blades. The pressurised air is supplied to one side of the turbine disc by causing the air to flow between a cover plate secured in an air tight manner to the turbine disc, and the air passes via a cavity between the root of each blade and the perimeter of the disc into the cooling passages in the blades.

In practice it is difficult to achieve an air tight seal between the cover plate and the disc whilst still allowing for differential thermal expansion between them.

One proposed seal comprises a flexible deformable metal wire located between co-operating parallel surfaces of the disc and cover plate and a clamping device for clamping the disc and cover plate together. This type of sealing arrangement usually requires that air pressure outside the cover plate be greater than that of the cooling air in order to bias it towards the disc. However, it is not always possible, or desirable to do this.

In the above-mentioned prior known arrangement the internal pressure of the air and the centrifugal forces on the cover plate tend to pull the cover plate away from the disc. This is particularly a problem where the cover plate is of a conical shape to accommodate a large central mass of the disc.

An object of the present invention is to provide a sealing arrangement between components which rotate together, and between which relative radial movement is tolerated, which employs the centrifugal forces on a sealing member to effect sealing between the components.

According to one aspect of the invention there is provided an arrangement for effecting a seal between two components which rotate together and between which relative movement in a radial direction is tolerated, the arrangement comprising a clamping means for clamping the components together, and a conical sealing ring which, in use, is urged radially outwards to engage at least part of one of the components along a line of contact extending in a circumferential direction, the sealing ring being so shaped and dimensioned that, in use, centrifugal forces acting on the ring impart a turning moment to the ring about the said line of contact thereby causing it to effect a seal between the sealing ring and each of the components.

One component may be a turbine or compressor disc of a gas turbine engine in which case the other component may be a cover plate, seal plate or other structure.

According to a further aspect of the invention there is provided an arrangement for effecting a seal between a turbine or compressor disc of a gas turbine engine and structure which is in sealing contact with the disc and rotates therewith, the arrangement comprising the provision of a recess in a side of the disc that faces the structure, the recess having an abutment face defining a radial outer extremity of the recess, a conical sealing ring located in the recess between the structure and the disc, and a clamping means for clamping the structure to the disc, the conical sealing ring being so shaped and dimensioned that in use, when clamped between the disc and the structure, its outer periphery is urged into contact with the said abutment face along a line of contact extending in a circumferential direction, and the resultant of centrifugal forces on the sealing ring acts in a plane intermediate the structure and the said line of contact thereby to impart to the sealing ring a turning moment which urges it into sealing engagement with the side face of the disc and the structure.

Preferably the sealing ring is provided with a concentric groove in a face that co-operates with the side face of the disc and a deformable member is provided in the groove for effecting a seal with the intermittent disc and the root or shanks of blades carried by the disc. The preferred material of the sealing ring is a Stellite steel known by the trade mark Haynes 25, and the preferred material for the deformable member is a metal wire such as silver or a silver alloy.

It is preferred that the groove in the sealing ring is shaped and positioned relative to the said circumferential line of contact so that its radial outer extremity is a conical surface with the large diameter of the surface adjacent to the disc so that, in use, centrifugal forces on the deformable member urges it into contact with the disc and a vector component of the centrifugal force on the deformable member normal to the conical surface of the groove acts in a plane intermediate the said circumferential line of contact and the structure.

Preferably the clamping means comprises a plurality of hooks spaced around the outer edge of the disc for receiving complementary lugs spaced around the periphery of the structure. The hooks may be constituted by recesses in projections on either the disc or the shanks of aerofoil blades carried by the disc.

Figure 2:
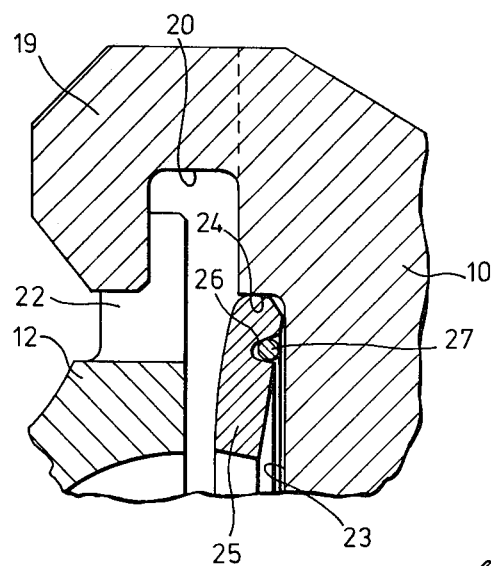
Figure 3:
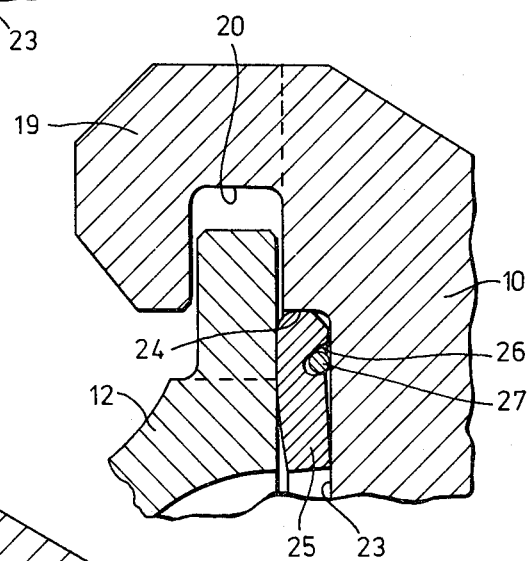
Figure 4:
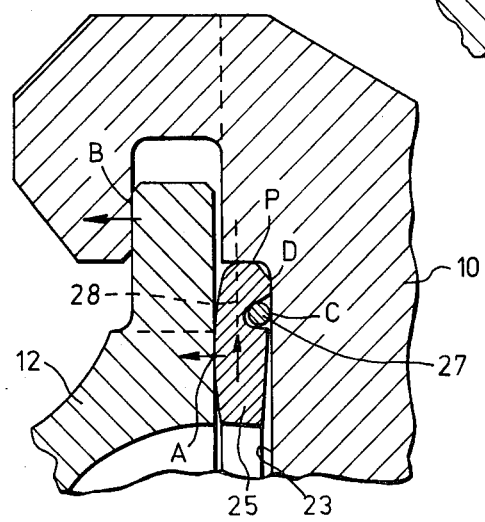

An embodiment of the invention will now be described, by way of an example, in which:

FIG. 1 is a schematic illustration of a turbine disc assembly for a gas turbine engine employing a sealing arrangement constructed in accordance with the present invention; and FIGS. 2, 3 and 4 show, in greater detail, those components of the sealing arrangement of FIG. 1 that are shown within the dotted circle of FIG. 1, and illustrate the steps involved in assembling the sealing arrangement.

Referring now to FIG. 1 the turbine disc 10 is mounted on a shaft in a manner well known in the manufacture of gas turbine engines. The disc 10 has connected to its central cob 11 a circular cover plate 12 which is in sealing contact with the side face 13 of the disc 10 around the periphery of the disc. A space 14 is formed between the cover plate 12 and the disc 10 through which high pressure air admitted to the space 14 can flow.

Turbine blades 15 mounted around the periphery of the disc 10 have a fir-tree root fixing and an air gallery 16 is formed between the base of the blade root 17 and the bottom of the blade slots in the disc 10. Air passages (not shown) in communication with air gallery 16 are provided in the blades so that the cooling air passes through the blades to cool them. To the rear of the disc 10 a blanking seal plate 18 is provided to prevent the cooling air supplied to the gallery 16 from leaking therefrom and from the fir-tree fixing splines. The seal plate 18 bears on an abutment ledge 9 on the rear of the disc 10 so as to provide a reaction force to resist the movement of the blades 15 rearwards relative to the disc 10.

Referring now to FIGS. 2 to 4 the disc 10 is provided with hooks 19 formed by machining a recess 20 in a plurality of projections on the disc 10. The hooks 19 are equispaced around a common pitch circle diameter.

The cover plate 12 is provided with the same number of matching complementary lugs 22 as there are hooks 19 on the disc 10. The lugs 22 are equispaced around the perimeter of the cover plate and are engaged in the hooks 19 by a bayonetting action. That is to say the cover plate 12 is offered up to the disc 10 with the lugs 22 positioned in the gaps between the hooks 19 and the cover plate 12 rotated relative to the disc 10 to engage the lugs 12 in the recesses 20.

The disc 10 is provided with a recess 23 that has an abutment face 24 that defines a radially outer extremity of the recess 23. Located in the recess 23 is a conical sealing ring 25 which is best seen in FIG. 2. The sealing ring 25 resembles a Belleville washer, and has a concentric groove 26 in its rear face in which is located a toroidal deformable seal member 27 made of a metal wire such as a silver alloy.

FIG. 2 shows the cover plate 12, disc 10 and sealing ring 25 just prior to clamping the cover plate 12 to the disc. This clamping action deforms the conical sealing ring 25 as shown in FIG. 4 causing the outer diameter of the ring 25 to contact the abutment face 24 along a circumferential line (represented by point P in FIG. 4), and the Belleville effect of the sealing ring 25 ensures that it contacts the disc at point D.

The sealing ring 25 is so shaped and dimensioned that in use with the disc 10 and cover plate 12 rotating at high speed (as shown in FIG. 4) the centrifugal forces on the ring 25 act along a plane (reference numeral 28) which passes intermediate the line of contact (P) and the cover plate 12. The centrifugal load imparts a turning moment to the ring 25 about point P and effects a seal at point A, between the ring 25 and cover plate 12, and at point C, between the seal member 27 and the side face of the disc 10 and the blade roots.

The groove 26 in the ring 25 is shaped and positioned relative to the circumferential line of contact (P) between the ring 25 and disc 10 so that its radial outermost extremity is a conical surface. The large diameter of the surface is arranged adjacent to the disc so that, in use, centrifugal forces on the resilient member 27 urges it into contact with the disc. Furthermore, the vector component of the centrifugal force on the resilient member 27 that is normal to the conical surface of the groove 26 is arranged to act along a plane intermediate the cover plate and the circumferential line of contact (P).

The hooks 19 provide the reaction force at B to resist movement of the cover plate 12 away from the disc 10.

Instead of providing the projection and hooks on the front face of the turbine disc 10 all the blades 15 may be provided with similar projections and hooks to engage lugs on the periphery of the cover plate 12. In this case, the centrifugal force on the conical cover plate produces a vector component that provides the reaction force resisting rearward movement of the blades relative to the disc. The seal plate 18 and, or, the shape of the blade slots in the disc and the root of the blades, may be modified to provide a suitable reaction force to prevent undesired movements of the blades relative to the disc. That is to say, if the reaction force produced by the cover plate on the blades exceeds the rearward component on the blade due to aerodynamic loads the seal plate 18 can be modified to provide a rearward reaction component on the blades.

I claim:

1. An arrangement for forming a seal, relying on both mechanical and centrifugal forces, between two components which rotate together and between which relative movement in a radial direction is tolerated, said arrangement comprising a deformable substantially frusto-conical sealing ring, which when mechanically urged radially outward, forms a circumferential line of contact along one of the two components, the frusto-conical sealing ring being so shaped and dimensioned that during rotation of the two components, centrifugal forces, acting on the deformable frusto-conical sealing ring, impart a turning moment to the sealing ring thereby forming a seal between the sealing ring and both of the components.

2. An arrangement for forming a seal, relying on both mechanical and centrifugal forces, between a turbine or compressor disc of a gas turbine engine and a structure which is in sealing contact with the disc or turbine and rotates therewith, the arrangement comprising a recess on one side of the disc which faces the structure, the recess having an abutment face, defining a radial outer extremity of the recess, a deformable frusto-conical sealing ring in the recess between the structure and the disc, and a clamping means for clamping the structure to the disc, the deformable frusto-conical sealing ring being so shaped and dimensioned that, when compressed between the disc and the structure, its outer periphery forms a circumferential line of contact with said abutment face, the frusto-conical sealing ring being so shaped and dimensioned that during rotation of said compressor disc or turbine with said structure, centrifugal forces, acting in a plane intermediate the structure and said line of contact, impart to the sealing ring a turning moment which urges it into sealing engagement along circumferential lines of contact with the side face of the disc or turbine and at another point with the structure.

3. An arrangement according to claim 1 wherein one component is a turbine or compressor disc of a gas turbine engine and the other component comprises a structure which rotates with the disc.

4. An arrangement according to claim 2 wherein the sealing ring is provided with a concentric groove in a face that co-operates with a side face of the disc and a deformable member is provided in the groove for forming a seal with the disc.

5. An arrangement according to claim 4 wherein the groove in the sealing ring is shaped and positioned relative to the said circumferentially extending line of contact so that its radial outer extremity is a conical surface with the larger diameter of the surface adjacent to the disc so that, in use, centrifugal forces on the deformable member urge it into contact with the disc and a vector component of the centrifugal force on the deformable member, normal to the conical surface of the groove, acts in a plane intermediate the said line of contact and the structure.

6. An arrangement according to claim 2 wherein the clamping means comprises a plurality of hooks spaced around the outer edge of the disc for receiving complementary lugs spaced around the periphery of the structure.

7. An arrangement according to claim 6 wherein the hooks are constituted by recesses in projections on the disc.

8. An arrangement according to claim 6 wherein the hooks are constituted by recesses in projections on aerofoil blades carried by the disc.

* * * * *